United States Patent [19]

Matsuzawa et al.

[11] Patent Number: 4,751,124

[45] Date of Patent: Jun. 14, 1988

[54] INFORMATION RECORDING MEDIUM

[75] Inventors: Takahiro Matsuzawa; Katsuyuki Takeda; Hiromichi Enomoto; Yoshitaka Takahashi; Shozo Ishibashi, all of Tokyo, Japan

[73] Assignee: Konishiroku Photo Industry Co., Ltd., Tokyo, Japan

[21] Appl. No.: 14,454

[22] Filed: Feb. 13, 1987

[30] Foreign Application Priority Data

Feb. 21, 1986 [JP] Japan .................................. 61-36639

[51] Int. Cl.$^4$ .............................................. G11B 7/24
[52] U.S. Cl. ..................................... 428/65; 346/135.1; 428/201; 428/209; 428/694; 428/900; 430/945
[58] Field of Search .................. 346/76 L, 135.1, 137; 369/13, 288; 428/65, 694, 900, 201, 209; 430/945

[56] References Cited

U.S. PATENT DOCUMENTS 4,310,919 1/1982 Slater .................... 430/945
4,331,996 5/1982 Moe .................... 346/135.1
4,432,002 2/1984 Ando .................... 346/135.1
4,555,716 11/1985 Odawara et al. .................... 346/137

Primary Examiner—George F. Lesmes
Assistant Examiner—William M. Atkinson
Attorney, Agent, or Firm—Frishauf, Holtz, Goodman & Woodward

[57] ABSTRACT

An information recording medium such as a magneto-optical recording medium is disclosed. The medium comprises two pieces of recording elements. Each element comprises a support and a recording layer provided on a part of one surface of the support. The two pieces of the elements adhere to each other by a non-corrosion-causing adhesive provided on a part of said surface where a recording layer is provided and a fast-hardening adhesive provided on a part of the surface where no recording layer is provided. The time required to adhere the two pieces of the elements can be considerably decreased and the corrosion of the recording layer by the adhesive can be avoided.

12 Claims, 2 Drawing Sheets

INFORMATION RECORDING MEDIUM

FIELD OF THE INVENTION

The present invention relates to an information recording medium, for example a magneto-optical recording medium.

BACKGROUND OF THE INVENTION

An optical disc is characterized by its high data density, large data capacity and high speed data access, and various research and development programs are presently in progress. For a recording medium of one type of optical disc which allows an additional recording only once, TeOx, TeC, Te-Sn-Se and the like are known in the art and some of them have been already marketed.

With an optical disc dedicated to playback, the playback on both sides of the disc is realized by using a disc wherein two recording layers each having a reflection layer of Al are bonded to each other with a hot-melt adhesive as disclosed in Japanese Patent Publication Open to Public Inspection (hereinafter referred to as Japanese Patent O.P.I. Publication) No. 6538/1983. An optical disc with which information is recorded by providing microscopic holes (known as pits) on a recording layer with a laser beam has an air-sandwich structure, as shown in FIG. 4, with which the adhesion is provided on the inner and outer circumferencial areas of a disc where a recording layer 1 does not exist. In such an example, a heat-hardening type epoxy adhesive or an ultraviolet-ray-hardening adhesive is used as an adhesive 6 to bond both supports 4 and 5 to each other via spacers 2 and 3 to enclose air space 7. Other than these adhesives, a two-liquid type normal-temperature-hardening epoxy adhesive may be also used. At the same time, as an erasable optical recording system, the magneto-optical recording system has attracted attention.

Some of magneto-optical recording media, for example, an optical disc, involve transparent supports on which a magnetic alloy layer composed of at least one of rare earth elements such as Sm, Eu, Gd, Tb, Dy, Ho, Er and the like as well as at least one of transition elements such as Fe, Co, Ni and the like is formed through sputtering or vacuum depostion to form an amorphous layer, whereupon a protective layer comprising organic substances may be coated in order to provide wear resistance.

With an magneto-optical disc, there is no need for the air sandwich structure, mentioned above. Accordingly, it is advantageous in terms of cost to bond the whole surface with the counterpart.

However, such a magneto-optical recording medium has as a recording layer a very corrosive material for example Gd, Tb or Fe. When two recording layers are bonded to each other by the above-mentioned hot-melt adhesive, the layers are readily corroded with such an adhesive. Therefore, such an adhesive is unusable for magneto-optical disc. Additionally, the recording layer transmits only a little amount, if any, of ultraviolet rays. Consequently, an ultraviolet-ray-hardening adhesive cannot be used to mutually bond two supports each having a recording layer. Additionally, such supports having a recording layer are hereinafter called recording elements. When an epoxy adhesive is used, a two-liquid-mixing type of the similar adhesive involves a complex process control, and, furthermore, insufficient mixing of two liquids may cause corrosion of the layer, because the hardener itself corrodes Gd, Tb and Fe. With a mono-liquid heat-hardening type of the similar adhesive, it is difficult to use a plastic for the recording element because of the heat deformation. Also, it is impossible to avoid thermal degradation of the recording layer. The production cost is higher, as this type of adhesive necessitates the provision of hardening furnace.

Though a mono-liquid-hardening type polyurethane adhesive and the like are useful adhesives as their mono-liquid non-solvent component hardens at normal temperature range, without corroding a recording layer. However, with this type of adhesive, the hardening process is slower and takes more than one day if it is left in an ordinary room, resulting in the poor productivity.

Additionally, it is technically difficult to apply a fast-hardening adhesive, such as a cyanoacrylate adhesive, upon the larger area such as the surface of disc, and the adhesive itself is expensive.

SUMMARY OF THE INVENTION

It is the object of the present invention to provide an information recording medium such as an magneto-optical disc or the like wherein the bonding of recording elements is effected with a safe adhesive which does not corrode a recording layer, whereby the curing time, that is, the time span from the moment when both the elements are adhered to each other to the moment both the elements are tightly secured to each other, is greatly reduced.

The above object of the invention is accomplished by an information recording medium comprising two pieces of recording elements each comprising a support and a recording layer provided on a part of one surface of the support, wherein the two pieces of elements adhere face to face of said two faces to each other by a non-corrosion causing adhesive provided on a part of the surface where a recording layer is provided and a fast-hardening adhesive provided on the other part of the surface where no recording layer is provided.

More specifically, in adhering two pieces of recording elements to each other, the adhesive for the area containing information recording layer differs from the adhesive for the area containing no information recording layer. The adhesion is effected for the former area with a safe adhesive which does not corrode the information recording layer, and the adhesion for the latter area is carried out with a fast-hardening adhesive in order to reduce the curing time.

BRIEF DESCRIPTION OF THE DRAWINGS

FIG. 1 is a sectional view illustrating the adhesion of two information recording elements; and, FIG. 2 is a plan view of one of the two elements; and FIG. 3 is an enlarged fragmentary sectional view through a part of the already adhered photo-magnetic recording medium which contains two recording elements.

DETAILED DESCRIPTION OF THE INVENTION

Figure 1:
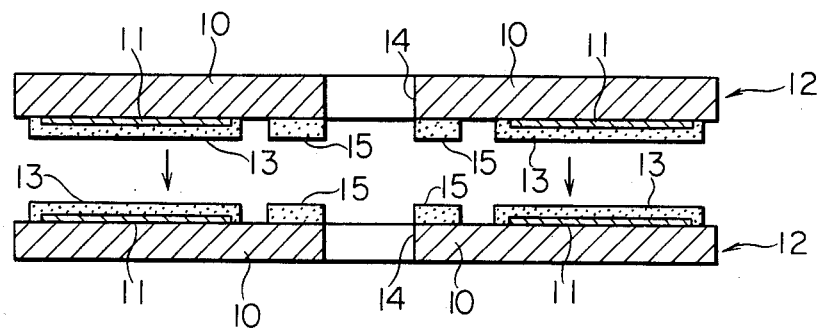
FIGS. 1-3 exemplify the present invention: where.

According to the present invention, two or more of the above-mentioned adhesives may be employed.

However, at least one of adhesives employed is of fast-hardening type. Such a fast-hardening adhesive is used to adhere the areas each having no information recording layer to each other. And, an adhesive which does not corrode the information recording layer is used, even though it is slow in hardening, to adhere the respective areas each of which has an information recording layer to each other.

The above-mentioned fast-hardening adhesives are preferably the adhesives which readily harden at the normal temperature and are exemplified by an ultraviolet-ray-hardening adhesive, cyanoacrylate adhesive, reaction-type acrylic adhesive and the like. The above-mentioned adhesives which do not corrode the information recording layer is preferably a mono-liquid moisture-hardening polyurethane adhesive and the like.

Among the examples of ultraviolet-ray-hardening adhesive, mentioned above, an ultraviolet-ray-hardening resin of cation-polymerization type especially, can avoid the permeation of oxygen and moisture, improving the corrosion resistance. Such a resin contains a primary components a resin as well as a cation polymerization initiator. As a resin, epoxy resins are favorable, and the examples of which include bisphenol A, polyglycidyl ether which is derived from a multifunctional alcohol as well as epichlorohydrin. Other suitable resins include resin series epoxides such as the following:

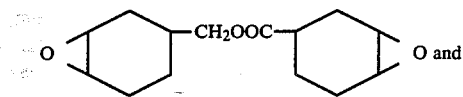 O and

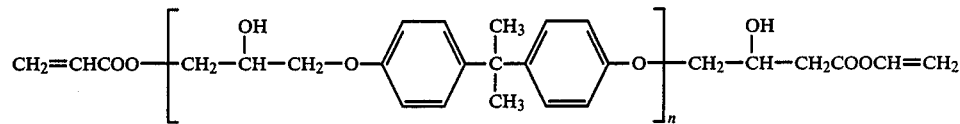

(Bisphenol A-epichlorohydrin diacrylate)

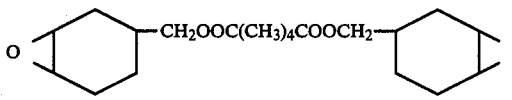

The examples of such a polymerization initiator include such complexes as a diazonium salt, sulfonium salt, iodonium salt and the like which were disclosed in Japanese Patent Examined Publications No. 14277/1977, No. 14278/1977 and No. 14279/1977. More specifically the examples include the following:

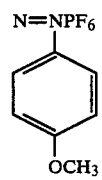

(4-methoxybenzene diazonium hexafluorophosphate)

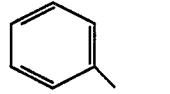

IPF$_6$

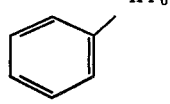

(Diphenyl iodonium hexafluorophosphate)

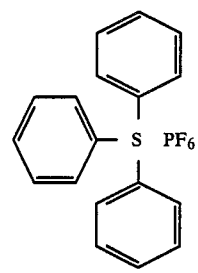

(Triphenyl sulfonium hexafluorophosphate)

Other usable ultraviolet-ray-hardening adhesives include acrylic series radical polymerization-type adhesives. Acrylate monomers and oligomers used in such adhesives include polyester types, epoxy types, polyurethane series and polyether types. The epoxy acrylate, below, is used with results as satisfactory as those of the above-mentioned cation polymerization type epoxy resins.

The above-mentioned cyanoacylate features excellent fast-hardening properties, and is available in the form of a product known as "Aron alfa" (manufactured by Toa Chemical Industry Co., Ltd.)

The favorable examples of above-mentioned reaction-type acrylic adhesive involves a two-liquid modified acrylic series adhesive (SGA manufactured by Cemedyne Co., Ltd. or Du Pont Japan Ltd.) wherein a mixture of elastomer and acrylic monomer rapidly hardens due to a redox system hardening mechanism. Such an adhesive is available in the form of either primer or two-liquid component type, however, the two-liquid component type may be sometimes advantageous in terms of stable properties.

As shown below, the above-mentioned mono-liquid moisture-hardening polyurethane adhesives, applicable to the present invention, involve a polyisocyanate which is prepared in such a manner that a compound having a plurality of isocyanate groups in one molecule and another compound having a plurality of hydroxy groups in one molecule such as a polyal are allowed to react to each other in the presence of excess isocyanate in order to provide the resultant molecute having plurality of isocyanate groups on the end groups.

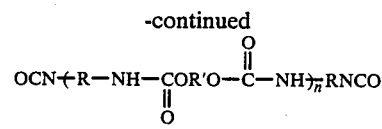

The hardening mechanism of this adhesive is as follows.

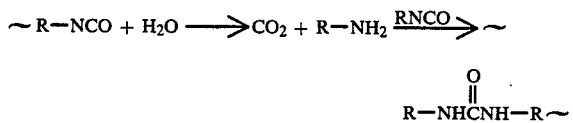

The polyisocyanates used for such a purpose include aromatic ones such as toluenediisocyanate, diphenylmethanediisocyanate and the like as well as aliphatic ones such as hexamethylenediisocyanate and the like.

As a polyol, 1,4-butanediol, 1,5-pentandiol, polyetherglycol or the like is employed.

The specific esamples of such polyurethanes include Imron manufactured by Du Pont Japan Ltd. Mondol 152 manufactured by Movoy Chemical Co., Ltd., Coronate 2013 manufactured by Nippon Polyurethane Industry Co., Ltd. and the like.

An information recording layer, especially, a photo-magnetic recording layer, which is advantageously used as an information recording medium of the invention, has an easy axis for magnetization vertical to the layer surface. With such a layer, information can be recorded, reproduced or erased by an optical beam. The layer may be composed of a known material, that is, an amorphous alloy comprising both a rare-earth element and transitional metallic element and is exemplified by TbFe, GdFe, GdTbFeCo, GdCo or the like. The layer may be, as known in the art, formed through sputtering.

A dielectric layer is usually provided on the photo-magnetic recording layer. The examples of such a dielectric substance include $Si_3N_4$, AlN, $SiO_2$, ZnS, ITO (Indium Tin Oxide) and others. Such a dielectric layer can be laminated upon a magneto-optical recording layer through sputtering. Additionally, another dielectric layer may be provided between a magneto-optical recording layer and a support in order to sandwich the magneto-optical recording layer with two dielectric layers. Such a sandwich structure appears advantageous because the arrangement significantly reduces introduction of oxygen, which otherwise often occurs, from a support in the course of layer formation when a support made of resin is used.

Various materials are available for the material of a support and include plastics such as polyethyleneterephtharate, polyvinyl chloride, cellulose triacetate, polycarbonate, polyimide, polyamide and polymethylmethacrylate. The shape of support, or substrate, may be sheet, card, disc, drum or long-span tape.

Figure 2:
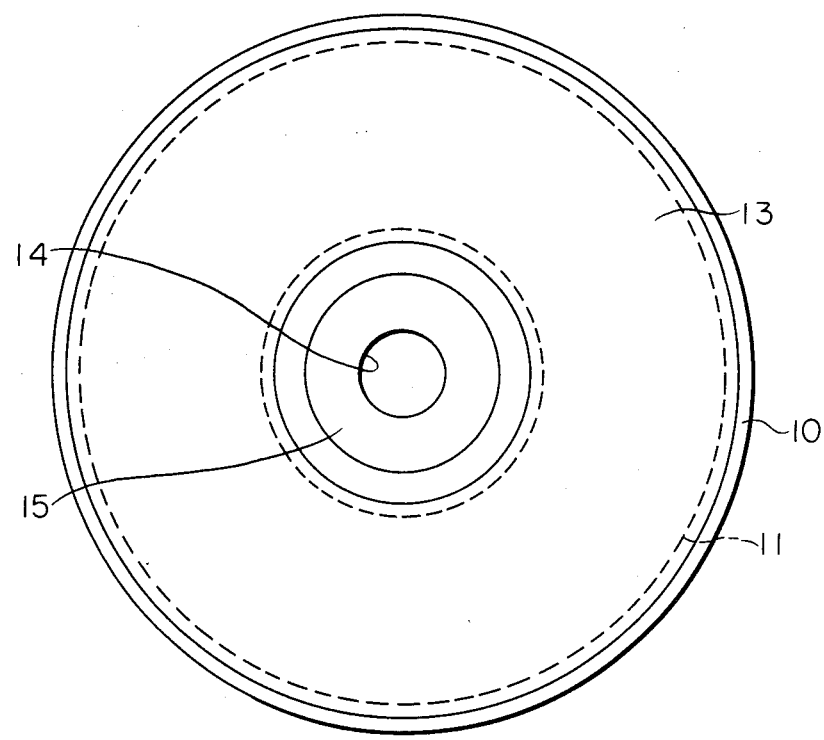

FIGS. 1 and 2 give schematic drawings for one example of information recording medium according to the present invention. With this example, an information recording layer 11 is provided on one side of each disc-shaped support 10 to form each of two sheets of recording elements 12 which are bonded to each other after inwardly positioning each information recording layer 11. During this course, two types of adhesives are used for this example, wherein a non-fast-hardening type adhesive 13 is applied to form a larger ring on the area of information recording layer 11, and at a certain distance from the adhesive 13 a fast-hardening type adhesive 15, which readily hardens at the normal temperature range, is applied to form a smaller ring around the center hole 14. With such an arrangement to separately employ two types of adhesives 13 and 15, the previously mentioned operational effect of the invention is accomplished. If an ultraviolet-ray-hardening type resin is employed as a fast-hardening type resin 15, sufficient radiation of ultraviolet rays can be applied through the support 10, as the area around the center hole does not involve an information recording layer 11. Despite its corrosiveness the fast-hardening type adhesive 15 may have over the information recording layer 11, it does not exerts adverse effects upon the layer, because it is applied at a sufficient distance away, as mentioned above, from the information recording layer 11. By using the fast-hardening resin 15, two recording elements are bonded to each other in a short period of time. Accordingly, in spite of swift adhesion with excellent operation efficiency, the misalignment of two elements does not occur.

Figure 3:
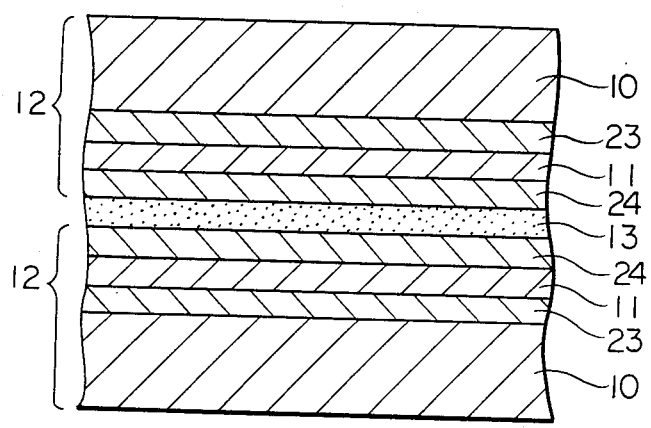
Figure 4:
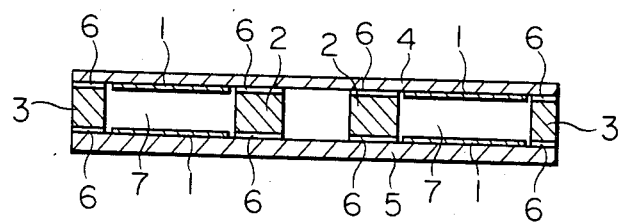
FIG. 4 is a sectional view illustrating an optical disc having a conventional air-sandwich structure.

FIG. 3 illustrates one example of the above-mentioned information recording medium in the form of a photo-magnetic recording medium, wherein two pieces of recording element 12 each being provided with a lamination located on a support 10 and comprising a magnetic recording layer 11 which is sandwiched between the dielectric layers 23 and 24. The outer dielectric layers 24 are bonded with non-corrosive adhesive 13 in face to face relationship.

Additionally, it is possible to protect the substrate by coating an ultraviolet-ray-hardening adhesive on each recording layer and allowing the adhesive to harden prior to the above-mentioned bonding.

The present invention is described in detail, below, by referring to Examples.

EXAMPLE 1

Masking was provided on a polycarbonate support having external diameter 120 mm and internal diameter 15 mm in such a manner to expose a ring-shaped area having internal diameter 47 mm and external diameter 115 mm, where $Si_3N_4$, GdTbFe and $SiN_4$ each being 1000 Å thick was deposited through sputtering in order to form a layer on the support. Then, an ultraviolet-ray-hardening resin (SD-17 manufactured by Dainippon Ink & Chemicals, Inc.) was applied on the recording layer through spin coating in order to form a protective layer. Also, an ultraviolet-ray-hardening adhesive (Aronix UV 3033 manufactured by Toagosei Chemical Industry Co., Ltd.) was coated upon the inner area without the recording layer, and, at the same time, a mono-liquid moisture-hardening type polyurethane adhesive (Imron manufactured by Du Pont Japan Ltd.) was coated upon the area provided with a recording layer. Then two pieces of recording elements were bonded to each other with each recording layer being faced to the counterpart, whereby the disc was treated with ultraviolet-ray radiation.

The resultant photo-magnetic disc was immediately subjected to a recording/playback unit, and the recording/reproducing was effected without any disadvantages. Next, the disc was left under the conditions, 68° C. and 80% RH, for one month. The bit error rate of signal varied from $2 \times 10^{-6}$ before the above environmental test to $1 \times 10^{-5}$ after the test.

EXAMPLE 2

Instead of an ultraviolet-ray-hardening adhesive used in Example 1, a cyanoacrylate adhesive comprising Aron alfa manufactured by Toagosei Chemical Industry Co., Ltd. was applied dropwise in a circular pattern on the inner area having no recording layer. The two pieces of recording elements were bonded to each other by using a polyurethane adhesive. Immediately, the measurement was taken without any disadvantages. Additionally, the variation of bit error rates before and after the environmental test was exactly the same as Example 1.

COMPARISON EXAMPLE

One piece of disc having a protective layer and prepared in Example 1 was coated with a primary component of reaction-type acrylic adhesive (SGA manufactured by Cemedyne Co., Ltd.). The similar disc was coated with a hardener of the similar adhesive. Then, these discs were bonded to each other and in approximately five minutes showed a bonding strength sufficient for practical use. However, when the finished disc was left for one week at 60° C. and 80% RH, the bit error rate varied from $2\times10^{-6}$ to $3\times10^{-4}$.

EXAMPLE 3

Instead of the ultraviolet-ray-hardening adhesive in Example 1 the SGA adhesive in Comparison example 1 was used, and, also, instead of the polyurethane adhesive in Example 1, a two-liquid-mixing type epoxy adhesive (Araldite manufactured by Showa High Polymer Co., Ltd.) was used. As a result, the finished disc showed in five minutes a bonding strength sufficient for practical use. The bit error rate varied from $2\times10^{-6}$ before the environmental test to $4\times10^{-6}$ after the test.

As can be understood from the above description, in the case of Comparison example, the bit error rate greatly deteriorated due to high corrosiveness of the reaction-type acrylic adhesive.

In contrast, excellent performance was attained with Examples 1 and 2 according to the invention. Additionally, in the case of Example 3, it seems that an insufficiently mixed portion was left in the course of mixing two liquids and the portion in turn caused the corrosion.

The present invention has been exemplified as shown above. However, the examples, above, may be further modified based on the technical concept of the invention.

What is claimed is:

1. An information recording medium comprising two recording elements each comprising a support and a recording layer on a part of one surface of said support, wherein said two elements are adhered to each other with each of said surfaces containing said recording layers begin in face to face relationship, said two surfaces being adhered to each other by (i) a first adhesive which covers at least said recording layer and which does not cover all of said surface and (ii) a fast-hardening adhesive which covers at least part of said surface which is not covered by said recording layer or by said first adhesive, said first adhesive (i) being non-corrosive to the recording layers and being slower hardening than said fast-hardening adhesive (ii).

2. The information recording medium of claim 1, wherein said fast-hardening type adhesive (ii) is selected from the group consisting of ultra-violet-ray-hardening adhesives, cyano acrylate type adhesives and reactive acrylate type adhesives.

3. The information recording medium of claim 1, wherein said recording layer comprises an amorphous alloy comprising at least one of rare earth element and at least one of transition elements.

4. The information recording medium of claim 1, wherein said recording layer comprises an amorphous alloy comprising at least one rare earth element selected from the group consisting of Sm, Eu, Gd, Tb, Dy, Ho and Er and at least one transition element selected from the group consisting of Fe, Co and Ni.

5. The information recording medium of claim 1, wherein said recording layer comprises an amorphous alloy selected from the group consisting of TbFe, GdFe, GdTbFeCo and GdCo.

6. The information recording medium of claim 1, wherein said recording layer comprises an amorphous GdTbFe.

7. The information recording medium of claim 1, wherein said recording element has at least one layer of a dielectric substance adjacent to said recording layer.

8. The information recording medium of claim 7, wherein said recording layer comprises an amorphous GdTbFe and said recording layer has a $Si_3N_4$ dielectric layer on one surface thereof and a $SiN^4$ dielectric layer on the other surface thereof.

9. The information recording medium of claim 1, wherein said first adhesive (i) is a mono-liquid type moisture-hardening poly-urethane adhesive.

10. The information recording medium of claim 9, wherein said fast-hardening type adhesive (ii) is selected from the group consisting of ultra-violet-ray-hardening adhesives, cyano acrylate type adhesives and reactive acrylate type adhesives.

11. The information recording medium of claim 10, wherein said recording layer comprises an amorphous alloy comprising at least one rare earth element selected from the group consisting of Sm, Eu, Gd, Tb, Dy, Ho and Er and at least one transition element selected from the group consisting of Fe, Co and Ni.

12. The information recording medium of claim 10, wherein said recording layer comprises an amorphous alloy selected from the group consisting of TbFe, GdFe, GdTbFeCo and GdCo.

* * * * *